United States Patent [19]

Barker et al.

[11] Patent Number: 4,739,477

[45] Date of Patent: Apr. 19, 1988

[54] IMPLICIT CREATION OF A SUPERBLOCK DATA STRUCTURE

[75] Inventors: Barbara A. Barker, Williamson County; Irene H. Hernandez, Travis County, both of Tex.

[73] Assignee: International Business Machines Corp., Armonk, N.Y.

[21] Appl. No.: 645,620

[22] Filed: Aug. 30, 1984

[51] Int. Cl.$^4$ ............................................. G06F 15/00
[52] U.S. Cl. .................................................. 364/300
[58] Field of Search ... 364/200 MS File, 900 MS File, 364/300, 523; 354/7, 8, 9; 400/61, 83; 340/721, 747

[56] References Cited

U.S. PATENT DOCUMENTS

| | | | |
|---|---|---|---|
| 3,648,271 | 3/1972 | McConnell et al. | 364/300 |
| 4,393,463 | 7/1983 | Aiken, Jr. | 364/900 |
| 4,402,058 | 8/1983 | Aiken, Jr. et al. | 364/900 |
| 4,538,183 | 8/1985 | Kanno et al. | 358/280 |
| 4,539,653 | 9/1985 | Bartlett et al. | 364/900 |
| 4,575,813 | 3/1986 | Bartlett et al. | 364/900 |
| 4,580,241 | 4/1986 | Kucera | 364/900 |
| 4,581,710 | 4/1986 | Hasselmeier | 364/523 |
| 4,587,631 | 5/1986 | Nielsen et al. | 364/900 |
| 4,591,999 | 5/1986 | Logan | 364/523 |

OTHER PUBLICATIONS

Electronic Design, vol. 30, No. 12, 6/10/82, pp. 5513 to 5520.
Siemens, vol. 12, No. 1, 1983, pp. 61 to 69.
Meyers, Cern 83-07, 7/21/83, pp. 21-41.
IEEE Comp. Soc. Wrkshp, 11 to 13 Nov. 1981, pp. 301-308.
Barkin et al., "Some Issues in the Design of an Editor--Formatter for Structured Documents", 9/81, IBM CSC TR #G 320-2136.
Prager et al., "Polite Project Progress Report", 4/82, IBM CSC TR #G 320-2140.
IBM TDB, vol. 27, No. 10B, 3/85, "Implicit Object Definitiion in a Multiple Data Editor", Barker et al.
BYTE, Feb. 1983, pp. 33 to 50, "The Lisa Computer System".
BYTE, Feb. 1984, pp. 30 to 54, "The Apple Macintosh Computer".

*Primary Examiner*—Gary V. Harkcom
*Assistant Examiner*—C. H. Lynt
*Attorney, Agent, or Firm*—C. Lamont Whitham

[57] ABSTRACT

An application composite editor for compound documents containing not only text but also graphics and tables to facilitate the manipulation of object sets in the formating algorithm. The editor works with a page layout philosphy wherein data objects reside on the page and data resides in the data objects. All pages reside within a document object, and some data objects may have additional objects within them. Objects are data-specific entities that the user can manipulate on the page. All objects exist within a specified boundary on the page, and this boundary is defined as an object set boundary. Object sets may be moved into positions on the page such that more than one object set is occupying a single displayable area on the page. Such an arrangement of objects creates a structure called a superblock. A superblock is any displayable area containing two or more objects sets positioned so that the object sets overlap one another, reside side-by-side or extend above or below one another. A text object set may not be overlapped by any other object set. Although the superblock is itself a complex structure, the creation of this structure by the editor greatly simplifies integration of different data types on the page for the user and allows the user to manipulate a group of object sets within a single displayable area on the page with relative ease. Moreover, formatting of the document is facilitated by the editor since the superblock is treated as an object set without taking into consideration the complexity inside the superblock structure except when a page end decision must be made.

9 Claims, 15 Drawing Sheets

FIG. 1

|   | | | GET | UNDO/REDO | PRINT | PASTE | END |
|---|---|---|---|---|---|---|---|
| SHOW | CREATE | DESCRIBE | SEARCH | GOTO | DELETE | MOVE | COPY |

```
H              JKLM COMPANY

L                                      4000 Santa Barbara Ave.
L                                      Anywhere, U.S.A. 70000
L                                      September 21, 1983

L  John Doe
L  9000 Western Avenue
L  Anywhere, Texas   78999

L  Dear John,

¶  These are the figures which you requested in your letter dated
   June 21, 1983. I have built the graph which reflects the actual
   net year end projection. If you need more information, please
   don't hesitate to ask.

G       700  |       Year End Projections
        500  | ▇
        300  | ▇ ▇ ▇
        100  | ▇ ▇ ▇ ▇
             |_____
                A  B  C  D          Company Name T       Company Name    Year End Projection
             A              600 Million
             B              500 Million
             C              420 Million
             D              275 Million
```

FIG. 13A FLOW OFF
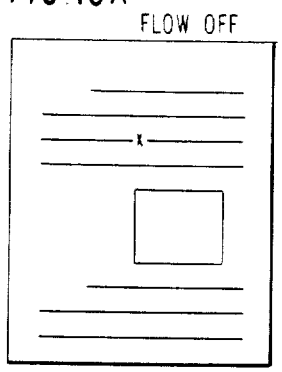
FIG. 13B FLOW ON
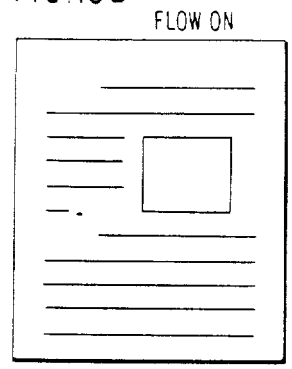
FLOW LEFT
FIG. 13C FLOW OFF
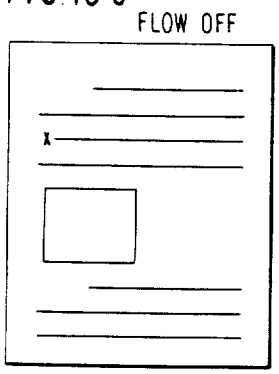
FIG. 13D FLOW ON
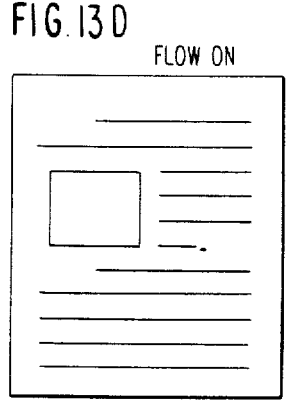
FLOW RIGHT
FIG. 13E FLOW OFF
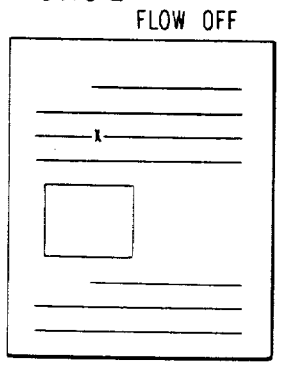
FIG. 13F FLOW ON
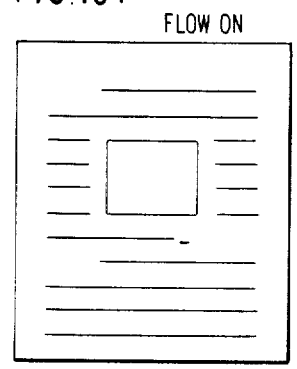
FLOW BOTH SIDES
x = SELECTED DESTINATION FOR OBJECT SET

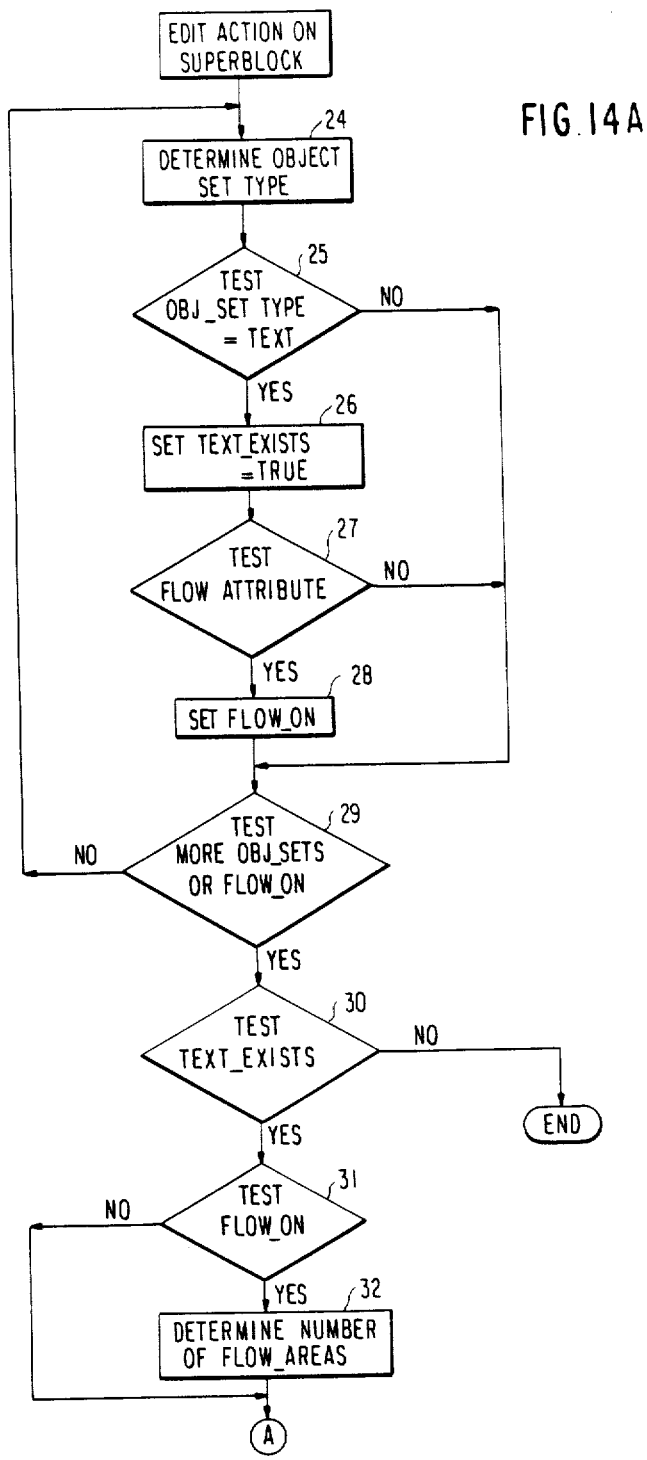

IMPLICIT CREATION OF A SUPERBLOCK DATA STRUCTURE

CROSS REFERENCE TO RELATED APPLICATIONS

The invention disclosed in this application is related to the inventions disclosed in the following applications filed concurrently herewith and assigned to the assignee of this application:

Ser. No. 645,622 for SUPERBLOCK STRUCTURE IN A MULTIPLE DATA EDITOR filed by Barbara A. Barker and Rex A. McCaskill on Aug. 30, 1984;

Ser. No. 645,630 for EDITING OF A SUPERBLOCK STRUCTURE filed by Barbara A. Barker, Irene H. Hernandez and Rex A. McCaskill on Aug. 30, 1984; and Ser. No. 645,621 for FLOW ATTRIBURE FOR TEXT OBJECTS filed by Irene H. Hernandez, Barbara A. Barker and Beverly H. Machart on Aug. 30, 1984.

The disclosures of the foregoing applications are incorporated herein by reference.

BACKGROUND OF THE INVENTION

The present invention generally relates to integrated multiple data editors and, more particularly, to a super block structure containing two or more diverse object sets positioned so that the object sets overlap one another, reside side-by-side, or extend above or below one another. The object sets may be text, graphics or tables, and once created, the super block structure is treated as an object set in the formating of a document thereby simplifying the formatting algorithm of the editor.

Computers are coming into more common use throughout society not only because computers can perform many jobs more efficiently than prior devices or methods, but because the relative cost of computers has decreased dramatically over the past decade. At first, mainframes and then minicomputers with multiple terminals made access to computers available to many people in larger businesses. With the advent of microcomputers for both business and personal use, great numbers of people now have access to computers. The trend is for most computer users not to be computer professionals or sophisticated in data processing techniques. It has therefore been necessary to design what have come to be known in the art as user friendly computer programs to allow the unsophisticated user to perform desired tasks on a computer without extensive training. One technique that has been employed is to provide the user with a menu of choices of the particular tasks or functions which may be performed. Such a menu may take the form of a full or partial screen display with spaces adjacent the menu entries where the cursor may be placed by the use of keys on a keyboard or other cursor moving device. A selection of the desired task or function is made by placing the cursor in the space adjacent that entry and pressing the ENTER key or other key provided for that purpose. The program may be provided with a series of menus so that the user is led through progressively more complex tasks or functions in a simple and unconfusing process. Such programs are generally described as menu driven programs as distinguished from command driven programs. In the latter case, the tasks or functions to be performed by the user must be chosen and entered by a series of commands. This type of program is typical of earlier types of programs and requires some degree of sophistication and training of the user.

In addition to making programs more user friendly, the recent trend has been to provide some form of integration of computer program applications. Without integration, the user must employ separate application programs for, say, word processing, data processing, and graphing, an it is often difficult to merge the outputs of the several applications in a single document. Therefore, the purpose of program application integration is to further simplify the use of a computer to produce a desired output product. Software integration has evolved in several forms. Perhaps the simplest form of integration is a series of application programs designed to work alike sharing the same files and using the same or similar commands to perform the same or similar functions. This form of integration is relatively easy to implement but does not allow the individual programs of the family to be run simultaneously. Currently, the most popular integrated software are what may be termed multiple-function programs. These are characterized as incorporating a variety of applications within one program. Such programs generally allow splitting of the screen into several different windows almost as if each were a separate program. Typically, these multiple-function programs include text, spreadsheet and business graphing applications. Somewhat similar to the multiple-function programs is the now evolving integration technique based on a database application environment wherein all applications share a common set of data. Quite a different approach is taken when an integrated operating environment is provided. In this approach, individual programs can share information and often appear on the screen at the same time, each in its own window. Applications can be chosen and combined in contrast to multiple-function programs that are limited to applications programmed into the package.

Integrated operating environments are best implemented in object-oriented systems. This is a relatively new approach in that software systems have traditionally had two components: data and procedures. The data represents the information manipulated by the software and the procedures represent a unit of the software. Actions occur when a procedure is invoked and is given some data to manipulate. The problem with this traditional approach is that the data and the procedure are treated as if they are independent when in fact they are really related. In contrast, there is only one component in an object-oriented system, i.e. the object which represents both the information and the manipulation of this information. A programmer using an object-oriented system sends a message to invoke a manipulation, instead of calling a procedure. The message includes a symbolic name which describes the manipulation but not the manipulation details. The object reciving the message determines which method to execute on the basis of the message selector. The most thorough investigation of the object-oriented approach has been done by the Xerox Learning Research Group in Palo Alto, Calif., which designed and implemented Smalltalk, a language very similar to the process of human interaction. A Smalltalk programmer implements a system by describing messages to be sent and describing what happens when messages are received.

Smalltalk has been particularly advantageous in the development of software for the user of personal computers with a high-resolution display, a keyboard, a pointing device such as a mouse, and a disk storage and processor unit. A pointing cursor is used to track the current screen mouse position and allows the user to point to any displayed object. Usually, the mouse has one or more buttons, one being used for object selection and another being used for menu presentation. Such a machine was designed and developed by Xerox to facilitate the research and development of Smalltalk. This machine is the Alto computer, and several machines were donated by Xerox to Stanford and Carnegie-Mellon Universities and the Massachusets Institute of Technology to be used for research projects. The Alto was never commercially produced.

Early in 1981, Xerox introduced the 8010 Star Information System, a personal computer patterned after the Alto computer for use in offices by business professionals. The Star is a multifunction system which combines document creation with data processing, electronic filing, mailing and printing. As in the Alto, an important component of the Star computer is an all points addressable (APA) or bit-mapped display screen which makes visual communications more effective by allowing full graphics flexibility. The approach in designing the Star computer was to first establish the fundamental concepts of how the user would relate to the system and then design the software and hardware specifications. The design of the Star user interface was based on a familiar user's conceptual model, seeing/pointing as opposed to remembering/typing, what you see is what you get (WYSIWYG), a set of universal commands, consistency, simplicity, a modeless interaction and user tailorability. There are icons on the display which represent office objects, such as documents, folders, file drawers, in-baskets, and out-baskets. The icons can be "opened" to enable the user to deal with the object the icon represents. Documents can be read, the contents of folders can be inspected and mail can be examined. Everything to be dealt with by the user and all actions available to the user have a visible representation on the screen so that the user never has to remember the different meanings and contexts of any key. The mechanism used to make these concepts visible is the property and option sheets. A property sheet presents all the possible options for a particular object such as, for example, type font and size, bold, italic, underline and superscript/subscript on a text character property sheet. To select any of these options, the user merely selects the option by pointing and pressing the appropriate button, and then to change any property on the property sheet, the user points to it and presses the appropriate button again. To prevent the user from being overwhelmed with information, property sheets display only the properties relevant to the type of object currently selected thereby hiding complexity until it is needed. The Star computer also allows the system to be tailored to fit the individual user's needs. The user can tailor the working environment by choosing the icons for the desktop display. Blank documents can be set up with text, paragraph and page layout defaults. The filing system can be tailored by changing the sort order in file drawers and folders.

Early in 1983, Apple Computer introduced a new kind of computer called the Lisa. Lisa's designers drew heavily on the previous work done at the Xerox Palo Alto Research Center, but they also refined several borrowed concepts and combined them with many new ideas. The first task tackled by Lisa's designers was to devise a new way for users to interact with the computer. The result was an internal "User Interface Standards" document that describes how a user interacts with the Lisa system. Like the Star computer, the desktop manager for the Lisa is an icon base, but unlike the Star where the icons can be put at fixed locations on the screen so that they can never overlap, the Lisa icons can be placed anywhere. For that reason, the Lisa computer can have overlapping, arbitrarily shaped objects on the display screen. The Lisa computer depends on the metaphor that the video display is a desktop, while the icons are objects on the desktop. Everything in the Lisa system is represented on the desktop by either an icon or a rectangular area referred to as a window. All icons can be selected via the mouse, and all windows can be scrolled horizontally or vertically, expanded or contracted, and moved by holding down the mouse button and moving the cursor. The design of the Lisa system is integrated. Each of the Lisa programs has a large amount of common behavior and structure. There are no modes to restrict the user's activities at a given time. For example, the user can switch from text to spreadsheet to graphing applications just as if those applications were separate sheets of paper on the desk. Like the Xerox Alto and Star computers, the Lisa computer is based on the Smalltalk language/operating system. The technology developed for the Lisa computer has been further refined in the recently introduced Macintosh and Lisa II computers from Apple Computer.

As part of a research effort at the IBM Cambridge Scientific Center in Cambridge, Massachusetts, to develop software techniques in the field of office systems, Sheldon Borkin and John Prager developed the personal on-line integrated text editor (POLITE). This is an easy-to-use, real-time editor and formatter for compound documents. A compound document is one containing images, draw graphics, charts, handwriting, text, tables and mathematical symbols. The philosophy of Polite is the idea that an editor should be able to handle integration of function in-line without having to invoke separate applications and without using a cut and paste buffer. The Apple Lisa and Macintosh and the Xerox Star computers are all integrated systems offering the capability to edit compound documents, but the method commonly used in those computers is to place the result of the requested function in a cut buffer and then return to the document editor to paste the result in the desired location. This is a time-consuming and tedious process. However, the inspiration for Polite was drawn from the research done at the Xerox Palo Alto Research Center, and the concepts of the Polite editor are similar to those developed for the Smalltalk programming language and further refined by the Star and Lisa computers. Since Polite is intended to have a very wide audience, the human factors of the system have been carefully considered. Some of the ease-of-use features of the system include unlimited UNDO and REDO functions, real-time formatting, use of menus, a pointing-based help system, multiple window editing, and tutorial "help-by-example". In Polite, there is no distinction between source document and formatted document. There is only one form of a document in existence, and it is always formatted and it is always printable. Thus, whenever the user makes a change, the document is automatically reformatted thereby providing immediate feedback to the user and elimating much of the guesswork that characterizes prior editors. The user sees a portion of the document on the screen along with a small menu identifying the current programmed function key definitions. On the function keys are requests (commands) which are either immediately executable or which act as a "gateway" to further menus. In these other menus, some of the function keys have other, i.e. local, definitions. The Polite system consists of two major functional components: the screen-manager and the document-manager. The document-manager contains Polite's internal representation of the document (both text and formatting information), while the screen-manager contains the displayable form of the document (the only form the user ever sees) and controls the interaction with the user. The screen-manager maintains a display-oriented WYSIWYG (what you see is what you get) representation of some subset of the document. This subset includes at least that portion of the document which fits on the screen, and possibly the whole document depending on the document size.

SUMMARY OF THE INVENTION

It is an object of the present invention to provide improvements in integrated computer software.

It is another more specific object of the invention to provide improvements in an application composite editor which simplifies integration of different data types on a page of a document.

It is a further object of the invention to provide a multiple data editor which facilitates the manipulation of a group of diverse object sets within a single displayable area on a page of a document and simplifies the formatting procedure of the editor.

The subject invention is directed to improvements in an application composite editor which is based on the Polite system. Like Polite, the application composite editor is an easy-to-use, real-time editor formatter for compound documents containing not only text but also images, graphics, tables, annotations and handwriting. The application composite editor provides integration of all data on a single page in relation to each other in dynamic editable form. All data types can be created within the same document, and text can flow around graphics or tables. All data in the editor resides on pages and all pages reside within a composite document. The user interface design for the application composite editor is based on the following ease-of-use features to make document creation and editing a quick, easily learned and straight forward process:

1. Use of key-word commands on a command bar which is always displayed at the top of the screen. The command bar lists all of the commands currently active for the type of data being edited.

2. Use of pop-down panels when a command is selected which lists a set of options which can be selected and/or modified.

3. Use of full screen windows as a mechanism for viewing and manipulating data.

4. Use of unlimited UNDO and REDO functions to allow the user to reverse previously performed functions without fear of damaging data.

5. Use of a help-by-demonstration function which allows the user to request a demonstration of how a particular command works. The editor will show the user how the command works by doing it and then undoing it.

The editor works with a page layout philosophy wherein data objects reside on the page and data resides in the data objects. All pages reside within a document object, and some data objects may have additional objects within them. Objects are data-specific entities that the user can manipulate on the page. The objects that are within other objects reside within a defined object set boundary. All objects are explicit, i.e. they are recognizable, choosable entities. Blocks are user-selected ranges of any part of the document. For example, a block can be defined as a range of cells in a column or a character string. The block object allows the user to underline characters, change fonts, or define a "keep" around a group of objects. When the user applies an attribute to the block such as underline, the underline is ignored where it has no meaning. For example, an underline of a set of graphics objects is not meaningful. All objects exist within a specified boundary on the page. This boundary is defined as an object set boundary. For example, a text character exists within the boundary of either a line object set or a paragraph object set; a rectangle exists within the boundary of a graphic object set; and a cell exists within the boundaries of a table object set. According to the present invention, object sets may be moved into positions on the page such that more than one object set is occupying a single displayable area on the page. Examples of this are a paragraph flowing around a graphic object set, a table object set next to a graphic object set and a graphic object set in the middle of a paragraph with text flowing above and below. Such an arrangement of objects creates a structure called a superblock.

A superblock is any displayable area containing two or more object sets positioned so that the object sets overlap one another, reside side-by-side or extend above or below one another. A text object set may not be overlapped by any other object set. As a result, text will always be readjusted according to its flow attribute. The purpose of the superblock structure is to simplify the calculation of the space the object sets occupy. By creating the superblock structure, the formatting algorithm does not have to take into consideration the complexity inside each object's block structure except when a page end decision must be made. Presentation of the complex relationship on the page is also simplified.

The superblock is implicitly created by the editor as the result of a user specified action. There are five actions which can cause the creation of a superblock. They are CREATE, MOVE, COPY, PASTE and GET. When the editor creates the superblock, the superblock icon is placed at the starting top boundary for the superblock. One method of selecting the superblock or of selecting one of the sets within the superblock is for the user to first select the superblock icon. A pop-down panel showing a list of the icon representations for each object set within the superblock structure is displayed, and the pop-down panel is positioned below the superblock icon and appears to the user as an extension of the icon. To select the object set within the superblock, the user selects the icon representation of the object set from the pop-down panel. Another selection method is to point at the desired object set within the superblock. An enclosing routine is then called to determine the object set selected. In cases where selection by pointing results in ambiguity, the first selection method should be used. When the user selects an object set within the superblock, the command bar changes to reflect the actions which are valid for that type of object set. Inside the superblock, the object set can be moved, copied, deleted, described, etc. The editor implicitly dissolves the superblock and replaces the superblock icon with an object set icon whenever there is only one object set remaining in the display space of the superblock. Inside the superblock, non-text object sets can overlay each other so that the data of an object set is totally hidden from view. When this occurs, the user can redefine the position of the obscured object set by selecting the object set, selecting MOVE from the command bar and then selecting a new destination for the object set. The destination can be inside the boundaries of the superblock or at some other document location. A superblock can cross page end boundaries as long as the data within the superblock can be split across pages. Although the superblock is a complex structure, the creation of this structure by the editor simplifies integration of different data types on the page for the user and allows the user to manipulate a group of object sets within a single displayable area on the page with relative ease.

BRIEF DESCRIPTION OF THE DRAWINGS

The foregoing and other objects, aspects and advantages of the invention will be better understood from the following detailed description with reference to the drawings, in which:

FIG. 1 is a sample "compound" document incorporating text, graphics and a table;

FIGS. 13A to 13F are illustrations which summarize the several possibilities of no text flow around a non-text object set and text flowing around a non-text object set;

FIGS. 14A and 14B, taken together, are a flow diagram illustrating the flow attribute for text objects;

DETAILED DESCRIPTION OF THE INVENTION

Figure 2:
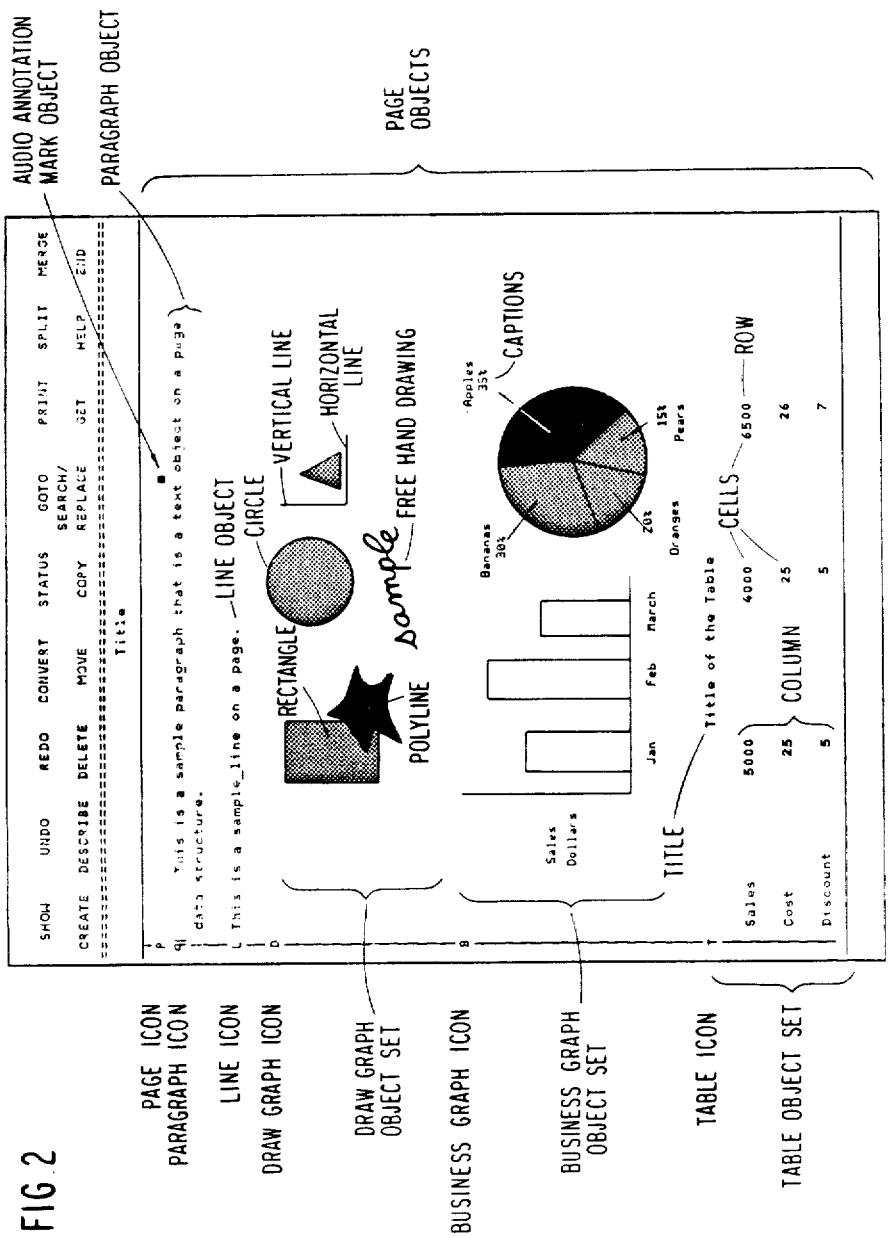
FIG. 2 illustrates the page layout philosophy of the application composite editor upon which the improvement according to the preferred embodiment of the invention is based.

The application composite editor upon which the improvement according to a preferred embodiment of the invention is based is an application that provides for the creation and modification of documents consisting of mixes of at least four different data types. The data types available are text, graphics (both free form and charts), and tables (structured spreadsheet array data and from tables). Documents containing more than one type of data are called compound documents. An example of a compound document is illustrated in FIG. 1 of the drawings. The example illustrated is a letter containing text, a vertical bar chart and tabular data. The application composite editor performs real-time WYSIWYG formatting and editing on such compound documents and is intended for use on personal computers such as the IBM PC/XT with a color graphics display. The editor is a single integrated programming application which is supported by the IBM PC disk operating system (DOS) and uses a windowing system to display and manage pop-down panels.

All data in the editor resides on pages and all pages reside within a composite document. Each paragraph within the text of the document exists as an entitiy by itself; therefore, the user can create each paragraph with its own attributes. One paragraph can be centered and double spaced, the next right adjusted and single spaced, and the following left adjusted and quadruple spaced. Each paragraph can have its own margin settings which can be different from the margins specified for the page. Moreover, paragraphs do not have to have a right and left margin that are fixed. A paragraph can be wrapped around a graph or table structure on the page. A variety of shapes are available for the user to choose from while creating graphic objects, and a variety of chart types are also available for selection. Tables can be a single cell or multiple row/multiple column tables. In the latter case, arithmetic computations within a cell are supported as in a typical spreadsheet application.

The example shown in FIG. 1 of the drawings also illustrates two application command bars at the top of the display screen. Within the command bars are command buttons which represent all the commands currently valid for the type of data being edited. The contents of these command bars change to reflect the actions which may be applied to the selected data type. A command may be selected by pointing with a pointing device, such as a mouse, and pressing an appropriate button. When a command is selected from the command bar and that command requires futher user interaction, a pop-down panel will be displayed. A specific example of the superblock object DESCRIBE pop-down panel is described hereinafter with reference to FIG. 18, but suffice it to say here that pop-down panels consist of keywords and/or value fields and/or informational text. Each pop-down panel has a QUIT button in its upper right-hand corner which, when selected by the user, causes the panel to be removed from the screen with the result that any selections made in a selection or parameter entry panel will be cancelled. Most multiple selection and parameter entry panels also have a DO button in the lower right hand corner which, when selected by the user, causes execution of the command. The pop-down panel is removed from the screen when the command is completed.

Also illustrated in FIG. 1 along the left hand margin are icons which indicate the type of data within an object set. The icons illustrated are H for heading, L for line, 1l paragraph, G for graphics, and T for table. The editor works with a page layout philosophy which is illustrated in FIG. 2 of the drawings. Data objects reside on the page and data resides in the data objects. All pages reside within a document object. Some data objects have additional objects within them as will be described in more detail hereinafter. Indicated in FIG. 2 are polyline, free-hand drawing and circle examples of free form graphics object sets and a pie-chart example of business graphics object sets. Objects are data-specific entities that the user can manipulate on the page. The objects that are within other objects reside within a defined object set boundary, and all objects exist within a specified boundary on the page. This boundary is defined as an object set boundary. More than one like data object may exist within a single object set. Depending on the type of data in the object set, the display space size can be constant or adjustable. For example, a paragraph is a dynamic object set; text can be added or deleted at any time. As a result, the display space of the paragraph changes to accomodate increases and decreases in data. For a graphic or table object set, the display space size is a function of the dynamic adjust attribute defined for the space and can be managed by the user. When the dynamic adjust attribute is on, the display space grows when data is added to the object set and shrinks when data is deleted. For a graphic object set, the default is dynamic adjust=ON. This means that the display space will be adjusted to fit the size of the drawing or chart. To change this default, the user points to the graphic object set icon and selects the DESCRIBE command in the command bar. The default for a table object set is dynamic adjust=OFF so that the size of the display space is constant and is equal to the minimum display space size of the table. As with the graphic object set, the user can change this default via the DESCRIBE command. If the displayable area of a graphic or table object set is constant, the data within the object may exceed the boundaries of the display space. For example, the user may have defined a table with 255 rows and 63 columns, but only 15 rows and 10 columns fit within the display space. When this occurs, the data within the object set is scrollable.

According to the invention, object sets may be moved into positions on the page such that more than one object set is occupying a single displayable area on the page. Examples of this are a paragraph flowing around a graphic object set or a table object set next to a graphic object set in the middle of a paragraph with text flowing above and below. Such an arrangement is represented by an object set structure called a super block.

Figure 3:
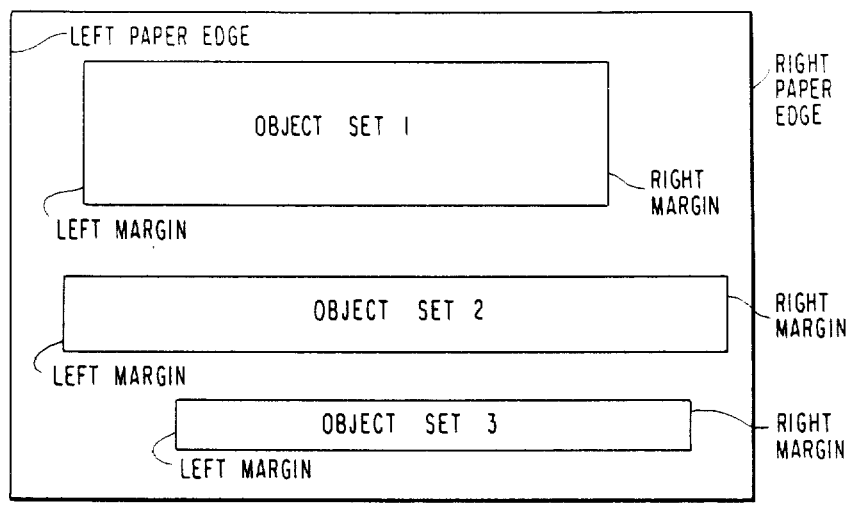
FIG. 3 shows the normal object set placement in a document.

The concept of object sets simplifies tee user's understanding of the editor. The user is free to create and design very complex structures and does not need to be aware of the difference between object sets and other types of objects. Object sets are automatically created when the user selects the line, paragraph, graphics or table option from the CREATE command pop-down panel. Once the object set has been created, the editor automatically determines which editing rules are applicable to the data within the object set. When an object set is created, the object set is placed on the page relative to the left and right hand margin offsets specified by the user. The normal placement of object sets on the page is continuous, i.e. each object set is placed immediately after the preceding object set as shown in FIG. 3 of the drawings. The left margin of each object set is defined as an offset from the left page edge.

Figure 4:
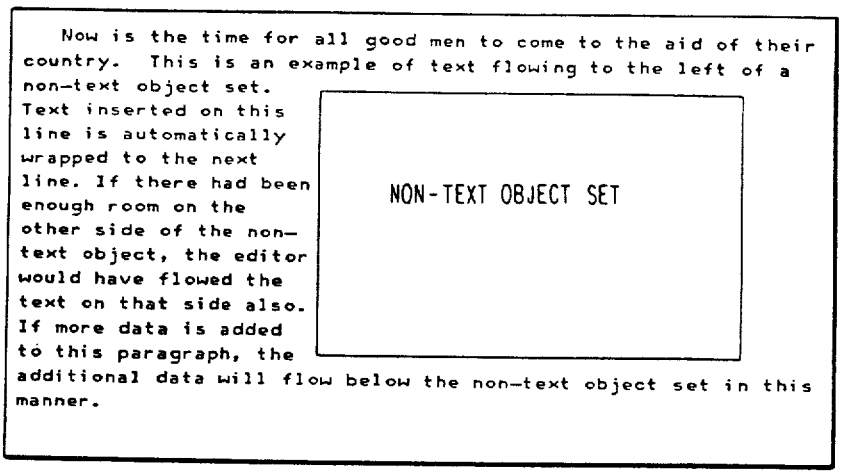
FIG. 4 illustrates a superblock according to the present invention with text flowing around a non-text object set.
Figure 5:
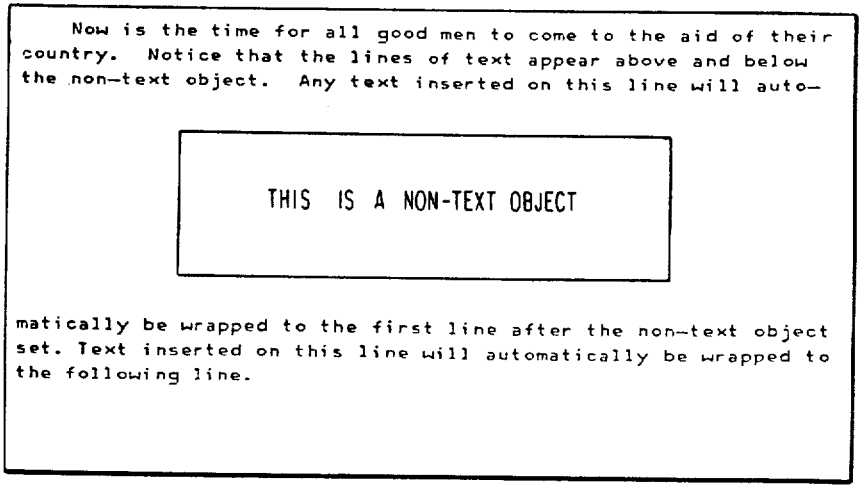
FIG. 5 illustrates a superblock with no text flow around a non-text object set.

According to the present invention, object sets do not have to be placed on the page consecutively. For example, a graphic object set can be placed in the middle of a paragraph so that the text of the paragraph flows around the graphic object set filling in any white space that was created by the insertion of the graphic object set. An example of this is shown in FIG. 4 of the drawings. This flowing of text implies a grouping of text and graphics and creates a superblock structure. As previously defined, a superblock is any displayable area containing two or more object sets positioned so that the object sets overlap one another, are side-by-side or extend above or below one another. A text object set may not be overlapped by any other object set in the composite text editor, and as a result, text will always be readjusted according to its flow attributes. If flow is off, text is placed above and below any non-text area as shown in FIG. 5. If flow is on, text is adjusted to fill in the white space around the non-text object set as shown in FIG. 4.

Figure 6:
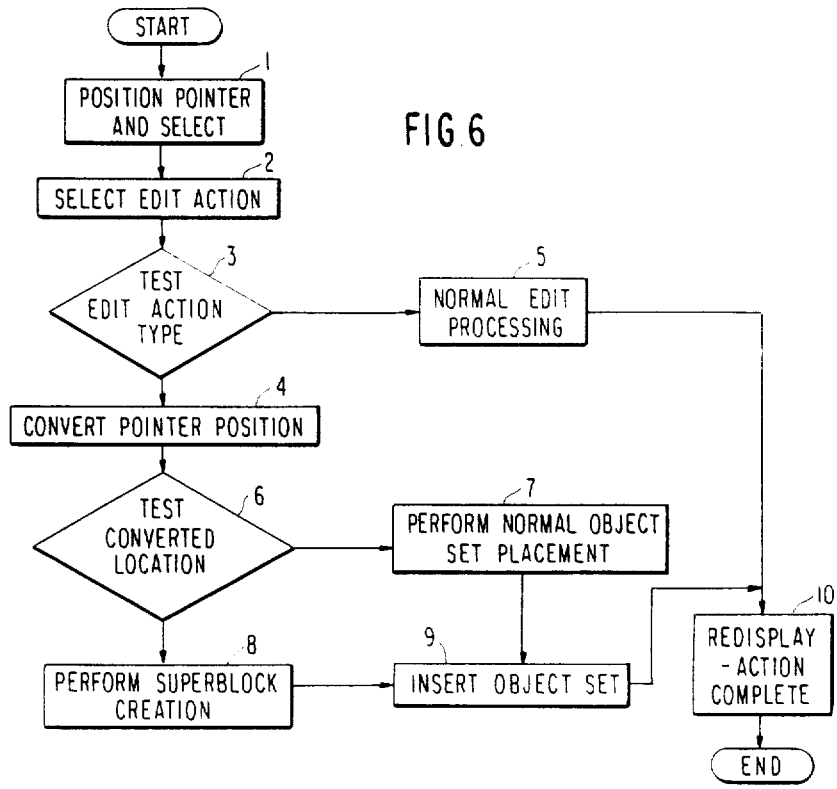
FIG. 6 is a flow diagram illustrating the process of implicitly creating a superblock structure.
Figure 7:
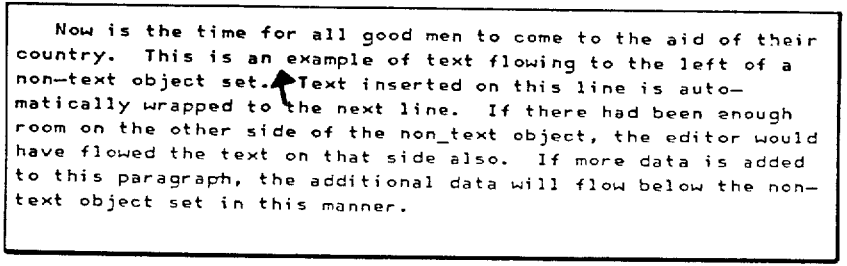
FIG. 7 illustrates the manner in which a location is selected within a text object set for the insertion of another object set thereby causing the creation of a superblock.

FIG. 6 is a flow diagram illustrating the process of the creation of the superblock. First, the operator fetches a pointer or cursor. The operator then moves the pointer on the display screen by means of a locator device, such as a mouse, until the pointer is at the desired window location as represented by the arrow in FIG. 7. When the pointer is at the desired window location, the operator presses a button or switch on the mouse to select the location. The positioning and selecting operations are depicted by block 1 in FIG. 6.

Next, the operator selects a command to perform an action. The command can be selected by any of several methods. These include selecting a command key, a command button from a command bar or entering a command on a command line. The selection of the command is depicted by block 2 in FIG. 6. After the command has been selected, a test is performed to determine if the edit action results in data being inserted. This test is depicted by block 3. If the result of the test in block 3 is true, then the pointer location is converted to a location within the document to determine if the location is within the bounds of a previously created object set. Block 4 indicates the conversion occurring. If the location is within the bounds of another object set, then a superblock object set is created; otherwise, a normal object set is created. Block 8 depicts the creation of a superblock, and block 7 depicts the creation of a normal object set. The result of creating the superblock in block 8 is shown by either FIG. 4 or FIG. 5, whereas the result of creating a normal object set in block 7 of FIG. 6 is shown in FIG. 3. After creation of either the superblock object set or the normal object set, the newly created object set must be inserted into the document.

This is indicated by block 9 in FIG. 6. If the result of the test in block 3 is false, then normal command processing follows as indicated by block 5. After all command processing is complete, the display screen is updated. This redisplay of the data is indicated by block 10.

The pseudocode for the implicit creation of a superblock is set forth below:

```
ON POINTER SELECTION
    CALL QUERY_LOCATION_POINTER
SELECT EDIT ACTION
IF EDIT ACTION=INSERT_DATA
THEN CALL GET_DOC_LOCATION
    IF DOC_LOCATION=EXISTING OBJECT
        SET
        THEN CALL CREATE_SUPERBLOCK
        ELSE CALL CREATE_OBJECT_SET
    CALL INSERT_OBJECT SET
    ENDIF
ELSE CALL NORMAL_EDIT
ENDIF
CALL REDISPLAY_DATA
```

When the mouse button is pressed and a location within a window is defined, a routine is called to determine the location of the pointer (CALL QUERY_LO-CATION_POINTER). If the action selected involves the insertion of data, a routine is called to determine if the defined window location is within tne boundaries of an existing object set in the document (CALL GET_DOC_LOCATION). If the defined window location is already occupied by an object set, then a routine is called to create the super block structure and insert the super block object set at the defined window location (CALL CREATE_SUPERBLOCK).

The CREATE_SUPERBLOCK routine creates an object set of type super block and links the existing object set to the first object_id structure within the super block structure. A routine is called to create the new object set (CALL CREATE_OBJECT_SET). The new object set is linked to the first object set. Within the super block, the x,y offset of tne new object set is determined. The left and right margins of the superblock are determined by the left margin of the object set closest to the left side of the page and by the right margin closest to the right side of the page. If the placement of the new object set in the superblock is such that the left margin is greater than or equal to the right margin offset or if any insert/overlap rules are violated, the superblock is adjusted according to the attributes defined for the object set to which the data belongs. After creation, a routine is called to insert the superblock object set into the document after the preceding object set (CALL INSERT_OBJECT_SET).

If the defined window location is not occupied by an object set, then a routine is called to create an object set of a type different from the superblock type. Normal processing of the object set occurs and the INSERT_OBJECT_SET routine is called to insert the object set into the document after the preceding object set. If the edit action is not INSERT_DATA, then a routine is called to process the normal editing action (CALL NORMAL_EDIT).

After creation and insertion, a routine is called to update the window display (CALL REDISPLAY_DATA). The super block is displayed at the defined window location. The superblock icon is placed adjacent to the super block data indicating that the user has implicitly created a super block.

Figure 8:
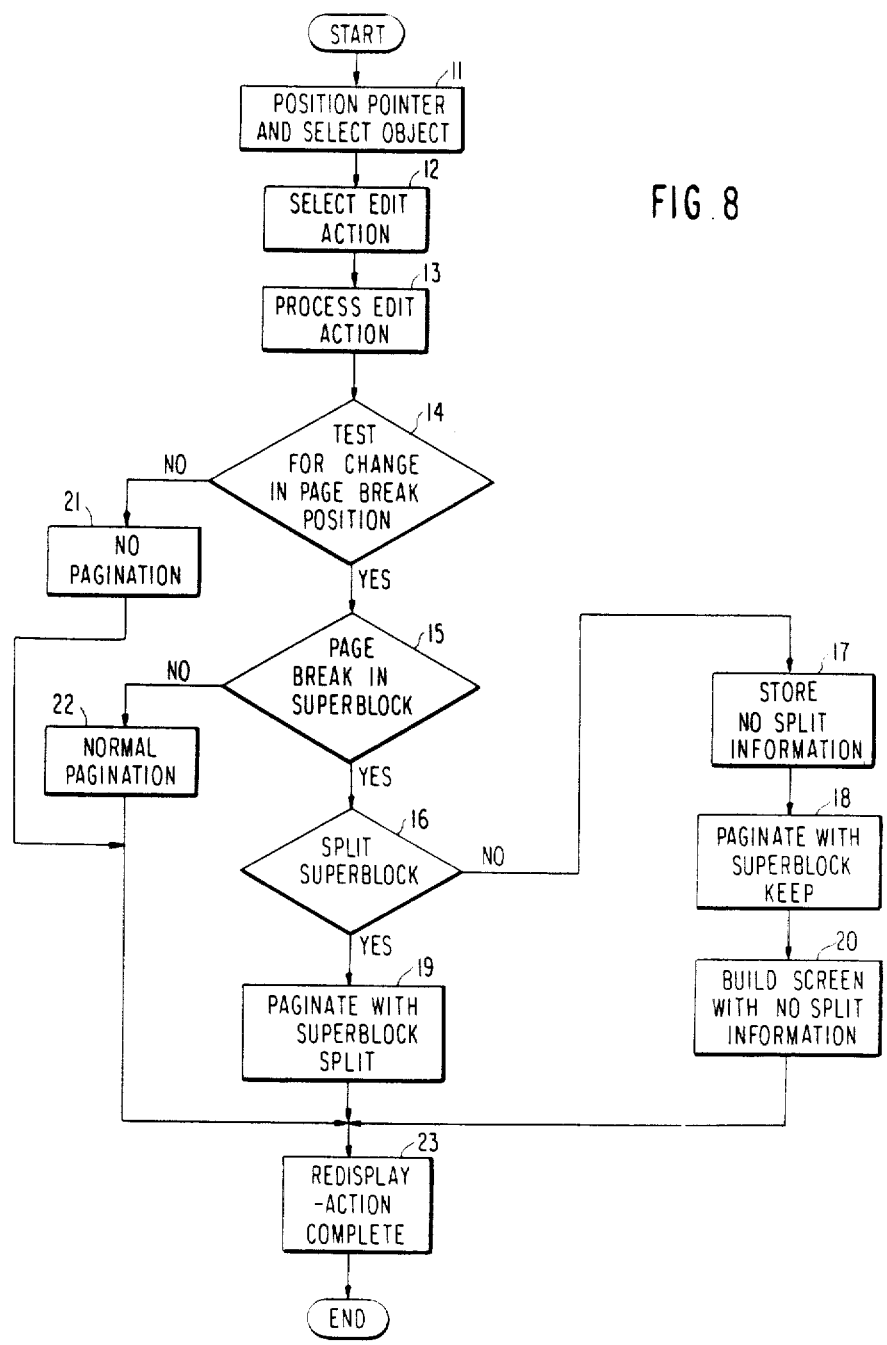
FIG. 8 is a flow diagram illustrating the process of editing a super block.

FIG. 8 is a flow diagram illustrating the process of editing a superblock structure once it has been created. First, the operator fetches a pointer or cursor. The operator moves the pointer on the display screen by means of some locator device, such as a mouse, until tne pointer is at the desired location, the operator presses a button or switch to select the object at the location or to select the location. Block 11 depicts the positioning and selection of an object location.

Next, the operator selects a command to perform an edit action. The command may cause the superblock to be modified. Block 12 depicts the selection of a command which can be accomplished by selecting a command key, a command button from a command bar or entering a command on a command line. After selection, the command is processed as depicted by block 13 in FIG. 8.

After the editor processes the command, the current document page is reformatted. If the reformatting cause a change in the page break position, the page needs to be paginated. The test for a change in the page break position is depicted by block 14. If no change occurred, there is no need to paginate. The edit action is complete and the current page is redisplayed. Block 21 indicates the no pagination path.

If the test indicates a change is needed in the page break position, a second test as depicted in block 15, is performed to determine if the page break occurs within the boundaries of a superblock. Normal pagination occurs if the result of the test is false. After pagination, the edit action is complete and the current page is redisplayed. The normal pagination path is indicated by block 22 in FIG. 8.

A page break occurring within a superblock means the editor must examine each object set within the superblock, as if the superblock were a separate document page, to determine where the superblock can be split. Block 16 depicts the split superblock test. If the super block can be split, the object sets within the super block are reformated and their positions readjusted. After reformatting, the edit action is complete and the document page is redisplayed. This path is indicated by block 19.

If, after examining the superblock, the editor determines that the superblock cannot be split, the editor stores the reason for the failure in a message record. Block 17 depicts this step. Since no split can occur, the editor formats the page as if the superblock had the keep attribute on. The editor either maintains the superblock on the current page if the super block is the only object on the page making a long page, or places the superblock at the top of the next page. Placing the superblock at the top of the next page may cause the following pages to become unformatted. An unformatted page is always formatted before being displayed on the screen. The paginate with superblock keep path is depicted in block 18 of FIG. 8. The edit action is complete, but before redisplaying the current page, the editor builds a message screen indicating the reasons the superblock could not be split. Block 20 depicts the building of the message screen. The message screen is displayed at the same time the document page is redisplayed. The operator now has the option of manually rearranging the object sets within the superblock, via the move command, so that the editor can split the superblock. The operator can select the object set by pointing at the object set or in the case where pointing is ambiguous, select the icon representing the superblock. The splitting of a superblock makes the data on a page appear more balanced and prevents long pages.

Figure 9A:
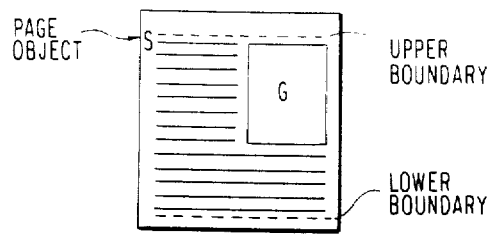
FIGS. 9A to 9C show the case of a superblock edited via a move edit function wherein the superblock boundaries do not change.
Figure 9B:
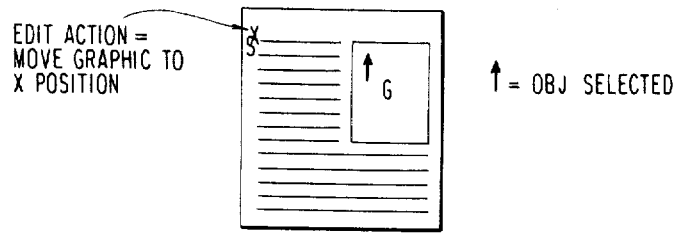
Figure 9C:
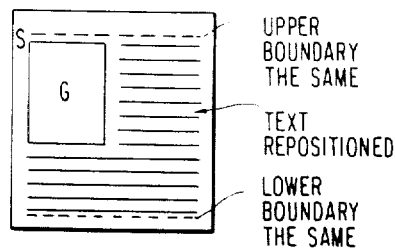

FIGS. 9, 10, 11 and 12 illustrate several cases of superblock editing. In FIG. 9, the superblock is edited via a move edit action and the page ending is not affected. In FIG. 9A, the superblock is shown prior to the editing action. The superblock comprises text and a graphic object set. In FIG. 9B, the graphic object set has been selected by means of the pointer as indicated by the symbol " ↑ ". The "x" in the upper left corner of the text represents the location where the graphic object set is to be moved. FIG. 9C shows the result of the edit action. It will be noted that there is no change to the upper or lower superblock boundaries.

Figure 10A:
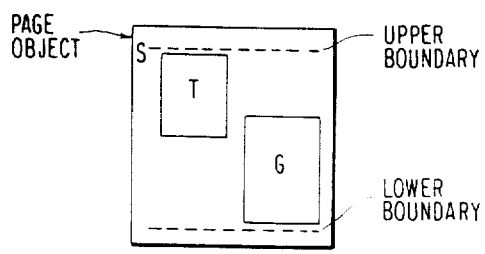
FIGS. 10A to 10C show the case of a superblock edited via a move edit function wherein the lower boundary of the superblock has changed thereby affecting the page ending.
Figure 10B:
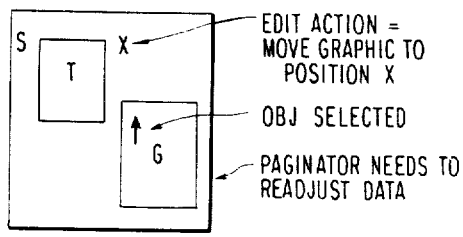
Figure 10C:
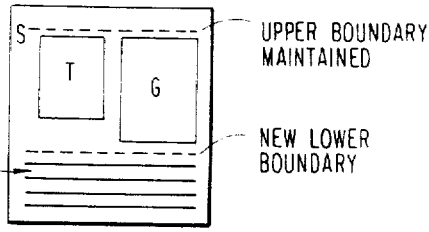

FIG. 10 also shows the editing of a superblock via the move edit function but in this case the page ending is affected. In FIG. 10A, the superblock is shown as comprising a table object set and a graphic object set with the table object set occupying the upper left quadrant of the page and the graphic object set occupying the lower right quadrant of the page. FIG. 10B indicates the editing action which the operator has commanded. Specifically, the graphic object set is to be moved upwardly on the page to occupy a position in the upper right quadrant of the page in a side-by-side relation with the table object set. The result of the editing action is shown in FIG. 10C, and since the lower boundary of the super block has moved upwardly with the movement of the graphic object set, text from the succeeding page flows into the current page.

Figure 11A:
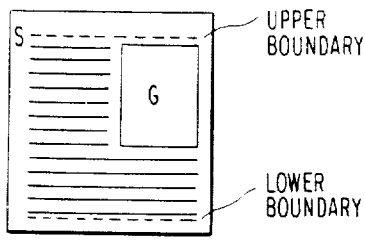
FIGS. 11A to 11C show the case wherein a superblock is edited via an insert edit command resulting in the superblock being split by a page end.
Figure 11B:
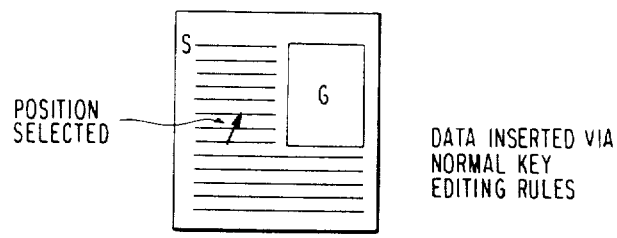
Figure 11C:
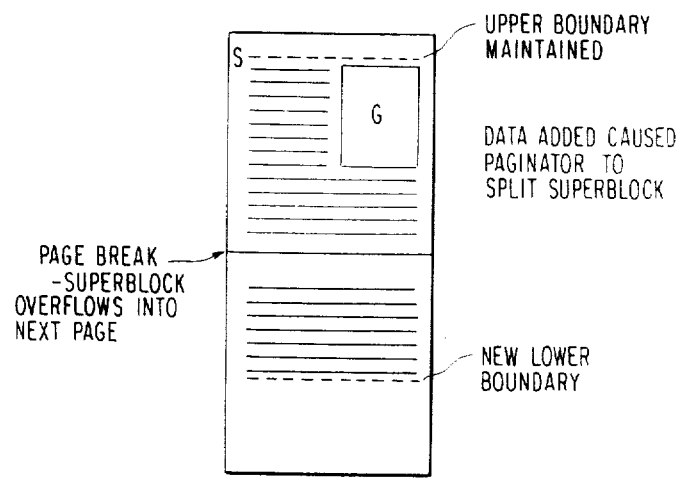

In FIG. 11, the super block is edited via an insert edit command and results in a page split in the middle of the superblock. The superblock shown in FIG. 11A comprises a text object set which flows around a graphic object set. In FIG. 11B, the pointer symbol " ↑ " indicates the location where additional text is to be inserted into the text object set. The result is shown in FIG. 11C where it will be observed that the lower boundary of the superblock is now on the next page. Because the super block exceeded the length of a page, it was necessary for the paginator to look into the super block structure to determine if the superblock could be split. This decision was affirmative since the text object set can be split between two pages. The next example shows the opposite result.

Figure 12:
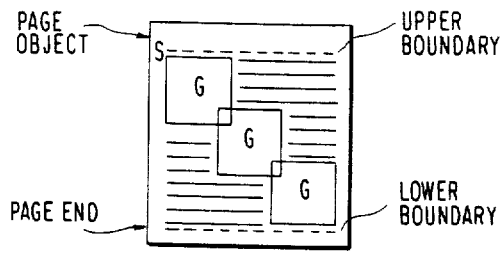
FIGS. 12A to 12C show the case wherein a superblock is edited via a create object action which results in the superblock overflowing the page size.
Figure 12:
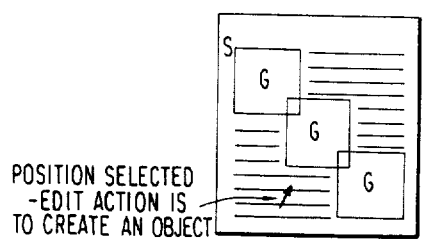
Figure 12:
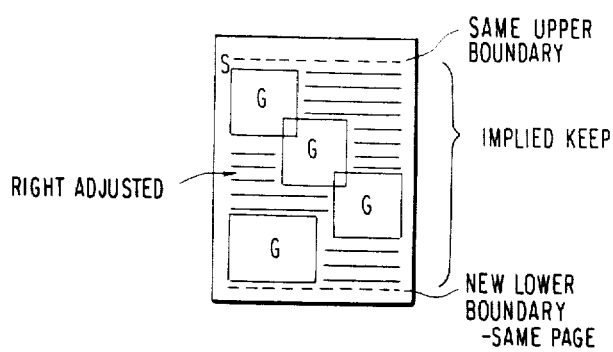

FIG. 12 shows the editing of a superblock via a create object edit action, and in this case, the editing action causes tne superblock to overflow the page. In FIG. 12A, the superblock is depicted as comprising three graphic object sets partially overlapping one another arranged along a diagonal of the page with text flowing around the graphic object sets to fill in the white spaces on the page. In FIG. 12B, the symbol " ↑ " indicates the location chosen for the creation of a fourth graphic object set. The result of the editing action is shown in FIG. 12C where it will be noticed that the text has been readjusted to flow around the several graphic object sets. Also, the new boundaries of the superblock overflow the boundaries of the page. This is because there is an implied keep around a graphic object set to prevent it from being split across pages. In the case shown in FIG. 12C, this implied keep prevents the paginator from splitting the superblock. When this happens, the editor displays a message to the operator that the superblock cannot be split across pages because of the graphic objects.

The pseudocode for the process of editing the superblock structure is set forth below:

```
ON POINTER SELECTION
    CALL QUERY_LOCATION_POINTER
    CALL TRANSLATE_LOCATION
    SELECT EDIT ACTION
    CALL EXECUTE_COMMAND
    IF EDIT ACTION = CHANGE PAGE BREAK
        THEN CALL FIND_PAGE_BREAK
            IF PAGE_BREAK IS WITHIN SUPERBLOCK
            BOUNDARY
                THEN CALL SPLIT_SUPERBLOCK
                    IF SPLIT SUPERBLOCK IS TRUE
                        THEN CALL PAGINATE (PAGE,
                            SPLIT)
                        ELSE CALL CREATE_MESSAGE_
                            RECORD
                            CALL PAGINATE (PAGE,
                            KEEP)
                            CALL BUILD_MESSAGE_PANEL
                    ENDIF
                ELSE CALL PAGINATE (PAGE, NORMAL)
            ENDIF
    ENDIF
    CALL REDISPLAY_DATA
```

When the mouse button is pressed and a location within a window is defined, a routine is called to determine the location of the pointer (CALL QUERY_LOCATION_POINTER). Next, a routine is called to translate the pointer location from screen coordinates into document coordinates so that the object selected can be determined (CALL TRANSLATE_LOCATION).

After the location is defined, the operator selects an edit action. A routine is then called to process the selected command (CALL EXECUTE_COMMAND). If the execution of the command causes the boundaries of the selected object to change and as a result the current page to overflow, then a routine is called to determine the location of the new page break (CALL FIND_PAGE_BREAK). If the location of the new page break is within the boundaries of a superblock object set, then each of the object sets within the superblock must be examined to determine where or if the superblock can be split (CALL SPLIT_SUPERBLOCK). If the editor determines that the superblock cannot be split, this information is returned to the calling routine so that a message panel can be built to relay this data to the user.

If the superblock can be split, a routine is then called to paginate the current page and the succeeding pages as necessary. The input parameters for the paginate routine are a pointer to the current page and a paginate type variable. In the case of a superblock split, the paginate type is split (CALL PAGINATE (PAGE, SPLIT)).

If the superblock cannot be split, then the paginate routine is called to paginate the current page (CALL PAGINATE (PAGE, KEEP)). The editor either maintains the superblock on the current page if the superblock is the only object set on the page making a long page or places the superblock at the top of the next page. Placing the superblock at the top of the next page may cause the following pages to become unformatted and as a result cause more pagination to occur. The reasons that the superblock cannot be split are placed in a message record to be displayed to the user (CALL CREATE_MESSAGE_RECORD). Next, a routine is called to build the message panel for display (CALL BUILD_MESSAGE_PANEL).

If the location of the new page break is not within the boundaries of a superblock, then the paginator is called to paginate the current page with the paginate type equal to normal (CALL PAGINATE (PAGE, NORMAL)). After all editing is complete and if necessary, pagination has occurred, a routine is called to redisplay the data to the user. If a message panel was built during the edit process, this panel is displayed at the same time as the data is redisplayed.

FIGS. 13A through 13F illustrate the various possibilities of text flow or non-flow around a non-text object set. More specifically, FIGS. 13A, 13C and 13E show examples of non-flow of text. In each of these figures, the "x" in a line of text represents the selected destination for the non-text object set, i.e. the starting or upper left hand corner location selected by the user for the non-text object set. FIGS. 13B, 13D and 13F show the result of the movement of the non-text object set with flow on. More specifically, this operation is accomplished by the user first selecting the graphic object set from within the superblock and then selecting MOVE from the command bar and the destination for the object set. It is the super block structure according to the present invention which facilitates this kind of editing.

Each paragraph text object has an attribute called flow. The user can specify that flow for a paragraph is either on or off. If flow is on and another non-text object is inserted at either the left or right boundary, for example, of the original paragraph, the editor flows the text around the object. The editor determines which side to flow around by finding the orientation of the inserted object, i.e. which side, left or right, the inserted object is on. If the object is inserted in the middle of the page, the editor determines whether there is sufficient room between the left and right boundaries and the left and right edges of the object, respectively, for text and if there is, the editor flows the text on either side of the object.

Figure 14B:
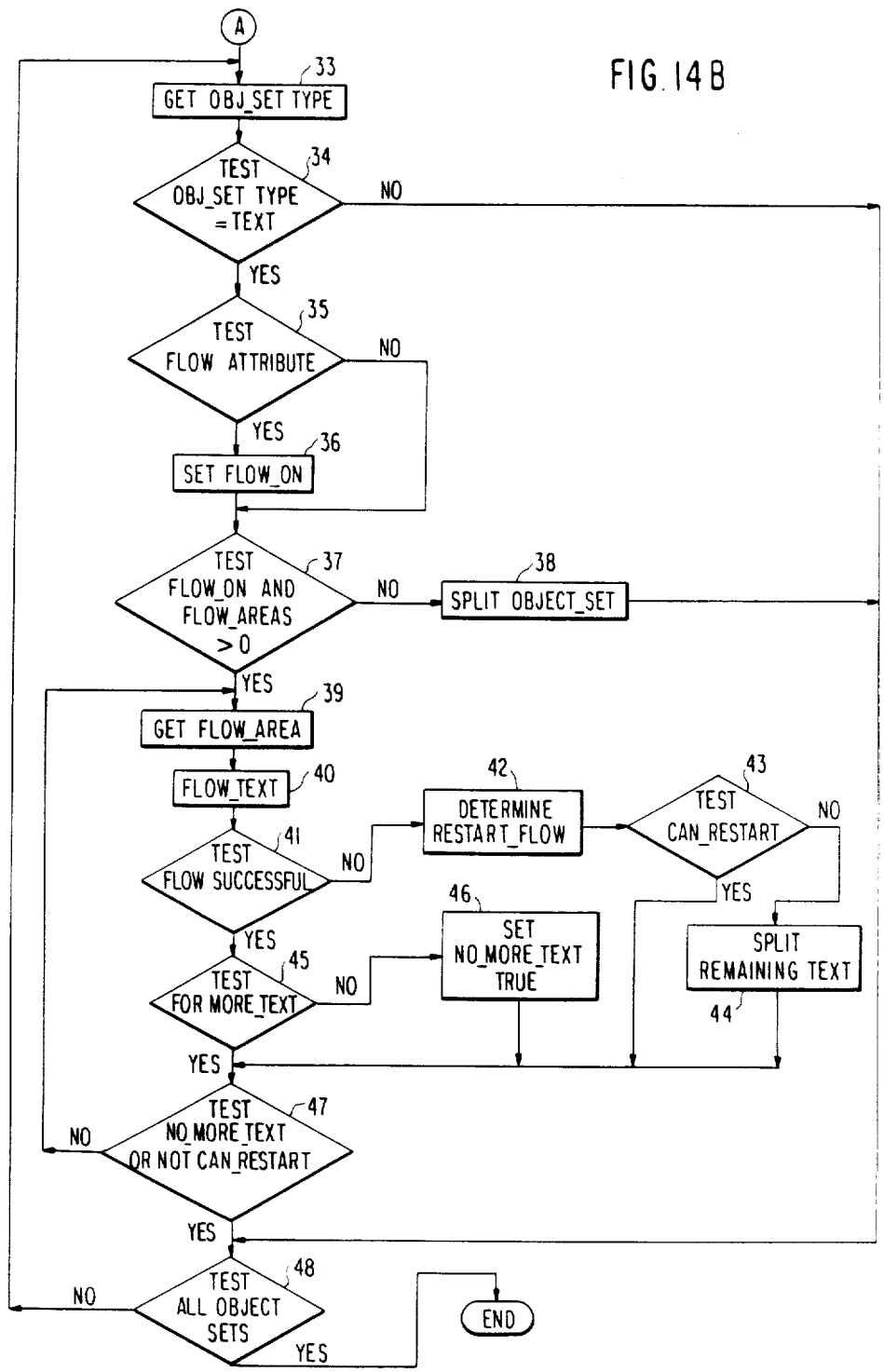

Referring now to FIGS. 14A and 14B, the starting point for the flow chart of the flow attribute for text objects is after some edit action has been performed on a superblock, and the editor determines that reformatting should occur. Reformatting is only necessary if there are text objects sets in the superblock and if at least one text object set has its flow attribute turned on. To determine if there are any text object sets, the editor gets the object set type of the first object set in the superblock and tests the type. Block 24 in FIG. 14A represents the determination of the object set type, and block 25 represents the test. If the test is true, the editor sets the text exists flag to true and tests the flow attribute of the text. The setting of the flag is depicted by block 26, and the flow attribute test is depicted in block 27. If this test is true, the editor sets the flow_on flag to true as indicated by block 28. Block 29 indicates the test of the conditions that will terminate the loop represented by the blocks 24 through 28. If there are no more object sets in the superblock to check or if the flow$_{13}$ on flag is on, then the loop is terminated and the action continues with block 30.

Block 30 is a test to see if a text object set is really in the superblock. If the loop terminated and no text object set has been found, then reformatting of the superblock is complete and no further action needs to occur. Next, a test is performed to determine if the flow_on flag is turned on. This test is shown by block 31. If this test is true, then the number of flow areas is determined as depicted by block 32.

The flow process loop begins with block 33 in FIG. 14B where the type of each object set in the superblock is determined. After the type is determined, a test is made to see if the type is text. If the type is not text, then control flows to the bottom of the loop where a test is made to see if all the object sets in the superblock have been checked. The test of the object set type is depicted by block 34 and the bottom of the loop test is depicted by block 48. If the object set type is text, then a test is made of the text object's flow attribute as shown in block 35. If the test is true, then the flow$_{13}$ on flag is turned on in block 36. If the flow$_{13}$ on flag is turned on and if the number of flow areas is greater than zero, another loop is entered to actually flow the text into each of the flow areas. Block 37 indicates the test of the flow$_{13}$ on flag and the number of flow areas. If this test fails, the text object set is split as shown in block 38 and control flows to the bottom of the process loop. If the test is true, then the flow action loop begins with block 39 where the editor gets the first flow area. Block 40 indicates the flow text routine executing. This routine will return a succeed or fail return code. This return code is tested in block 41. If the return code is succeed, then a test is made in block 45 to see if there is still text that needs to be flowed. If this test is false, then the no more text flag is set to true and action continues at block 47. If the return code of block 41 is fail, then a routine is executed to determine if flow can be restarted. Block 42 indicates execution of the restart flow routine. This routine also returns a succeed or fail return code which is tested in block 43. If the result is succeed, action continues at the bottom of the flow action loop in block 47. If the result is fail, the remaining text is split as indicated by block 44 and action also continues at block 47. The text in block 47 is to see if there is still text that needs to be flowed or if the flow failed and cannot be restarted. If the test in block 47 is false, control flows to the top of the flow action loop at block 39 and the flow action continues. If the test is true, then the flow action loop is completed and control flows to block 48 where the test is made to see if the flow process is complete. The flow process is complete when all the object sets in the superblock have been processed.

The pseudocode for the flow attribute for text objects is set forth below (assume that edit action has occurred on a superblock object set and reformatting of the superblock is needed):

```
TEXT_EXISTS = FALSE      {INIT TEXT EXISTS FLAG}
FLOW_ON = FALSE          {INIT FLOW FLAG}
REPEAT
    CALL GET_OBJECT_SET· TYPE
    IF OBJ_SET_TYPE = TEXT
        THEN TEXT_EXISTS = TRUE
            CALL TEST_FLOW_ATTRIBUTE(FLOW_ON)
    ENDIF
UNTIL ALL OBJECT SETS IN SUPERBLOCK CHECKED OR
FLOW_ON
IF TEXT_EXISTS
    THEN IF FLOW_ON
        THEN CALL DETERMINE_NUMBER_OF_
        FLOW_AREAS
    ENDIF
REPEAT
    CALL GET_OBJECT_SET_TYPE
    IF OBJ_SET_TYPE = TEXT
        THEN CALL TEST_FLOW_ATTRIBUTE(FLOW_ON)
            IF FLOW_ON AND NO_OF_AREAS < > 0
                {INIT TEXT DATA FLAG}
                THEN NO_MORE_TEXT = FALSE
                REPEAT
```

```
            CALL GET_FLOW_AREA
            CALL FLOW_TEXT
            IF FLOW_TEXT SUCCESSFUL
              THEN CALL RESTART_
                FLOW
                IF RESTART_FLOW
                  FAILED
                  THEN SPLIT
                    REMAINING
                    TEXT
                ENDIF
              ELSE
                IF ALL TEXT
                  DATA HAS
                  BEEN FLOWED
                  THEN N0_MORE
                  _TEXT = TRUE
                ENDIF
              ENDIF
            UNTIL NO_MORE_TEXT OR
              RESTART_FLOW HAS
              FAILED
          ELSE CALL SPLIT_OBJECT_SET
        ENDIF
      ENDIF
  UNTIL ALL TEXT OBJECT SETS IN SUPERBLOCK
    PROCESSED
ENDIF
```

When an edit action has occurred on a superblock object set and the editor determines that the superblock must be reformatted, the editor calls a routine to get the object set type of the first object set in the superblock (CALL GET_OBJECT_SET_TYPE). If the object set type is text, then a flag is turned on indicating that text exists (TEXT_EXISTS). Next, a routine is called to test if the text flow attribute is turned on for the text object set (CALL TEXT_FLOW_ATTRIBUTE(-FLOW_ON)). If the attribute is turned on, then a flag (FLOW_ON) is set indicating this state. The calls to get the object set type and test the flow attribute are repeated until either all the object sets in the superblock have been checkes or the FLOW_ON flag is turned off.

If the TEXT_EXISTS flag is on, a repeat loop is entered and continues processing as long as there are still text object sets in the superblock that may need to have text flowed around non-text object sets. Before entering the repeat loop, if the FLOW_ON flag is turned on, a routine is called to determine where the flow areas are located in the superblock (CALL DETERMINE_FLOW_AREAS). The minimum width allowed for a flow area is passed to this routine to be used in determining the number of flow areas in the superblock.

Upon entering the repeat loop, a call is made to get the first object set type (CALL GET_OBJECT_SET_TYPE). If the object set is text, then a routine is called to test if this text object set has its flow attribute on (CALL TEST_FLOW_ATTRIBUTE(-FLOW_ON)). If the flow attribute is on and if the number of flow areas is not zero, then the flow process is started or else a routine is called to split the text object set because flow cannot occur (CALL SPLIT_OBJECT_SET). The flow process is a repeat loop during which numerous calls are made to flow text into each of the flow areas. This repeat loop continues as long as there are still text object sets in the superblock to process.

After entering the second repeat loop, a routine is called to get the first area to flow text into (CALL GET_FLOW_AREA). The flow area order is determined by the editor when the flow areas are determined. Next, a routine is called to actually flow the text (CALL FLOW_TEXT). If the FLOW_TEXT routine is successful, then the flow process can continue; otherwise, a routine is called to attempt to restart the flow process in another flow area (CALL RESTART_FLOW). If the flow cannot be restarted, then the remaining text is split and placed after the non-text object sets. If the FLOW_TEXT routine is successful, then a text is made to see if all the text data in the text object set has been flowed. If this case is true, then the NO_MORE_TEXT flag is turned on. If the NO_MORE_TEXT flag is on or flow cannot be restarted, then the inner repeat loop is terminated. The outer repeat loop is terminated when all the text object sets in the superblock have been processed.

Figure 15A:
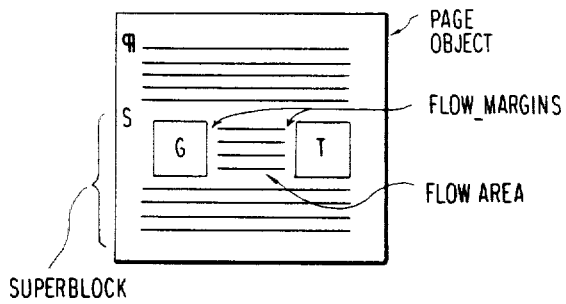
FIGS. 15A to 15D are illustrations showing additional examples of flow.
Figure 15B:
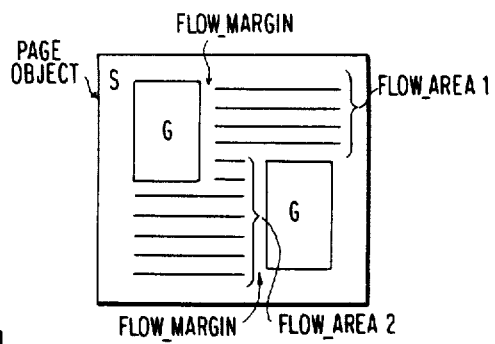
Figure 15C:
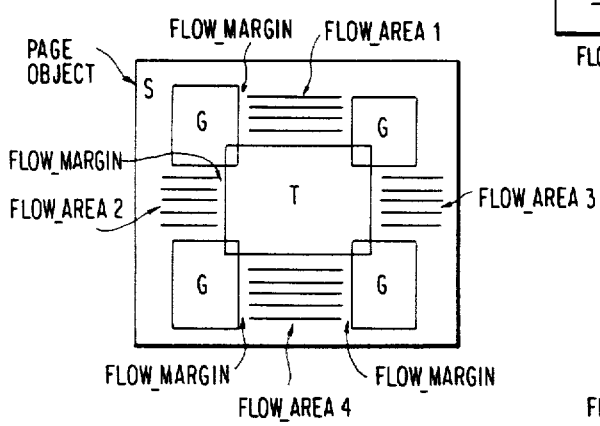
Figure 15D:
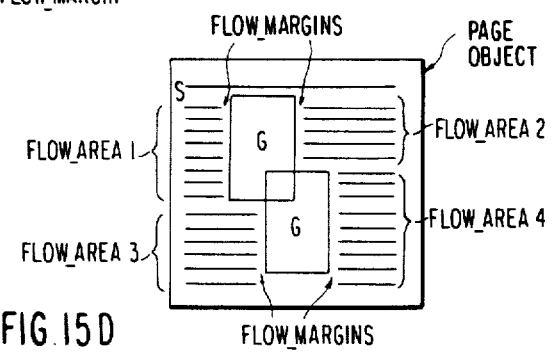

FIGS. 15A to 15D show other examples of flow to further illustrate the process. FIG. 15A shows text flowing between a graphic object set and a table object set in a superblock. FIG. 15B shows text flowing above, below and between two graphic object sets. FIG. 15C shows text flowing around a table object set and between several graphic object sets which overlap the table object sets. FIG. 15D shows text flowing on either side of two graphic object sets which overlap one another.

In addition to providing paragraph objects with the flow attribute, list objects (which are really a special case of a paragraph text object) are also provided with the flow attribute which the user can specify as being either on or off. If the flow attribute is on and another object is created or inserted in the middle of the list, the list text will flow around the inserted object as illustrated by the following example:

LIST OBJECT BEFORE EDITING

1. Item 1. This is item 1 which has a set of attributes of its own.
2. Item 2. This is item 2 having a different set of attributes.
3. Item 3. . . .
4. Item 4. . . .

| LIST OBJECT AFTER EDITING |
|---|
| 1. Item 1. This is item 1 which has a set of attributes of its own. |
| 2. Item 2. This item 2 having a different set of attributes.  [GRAPHIC OBJECT] |
| 3. Item 3. . . . |
| 4. Item 4. . . . |

In addition, a text paragraph object can be interrupted, and not broken by the insertion of a single-cell table or by an inserted list. When a text paragraph is interupted, it acts as a whole object that has a space in it. If a list interrupts the paragraph, the paragraph resumes when the list ends. When a change is made to the part of the paragraph that is prior to the list such that it causes text to be formatted and pushed down to the text that is below the inserted list, it skips over the list and continues formatting the remainder of the paragraph as if the list were not there.

Figure 16:
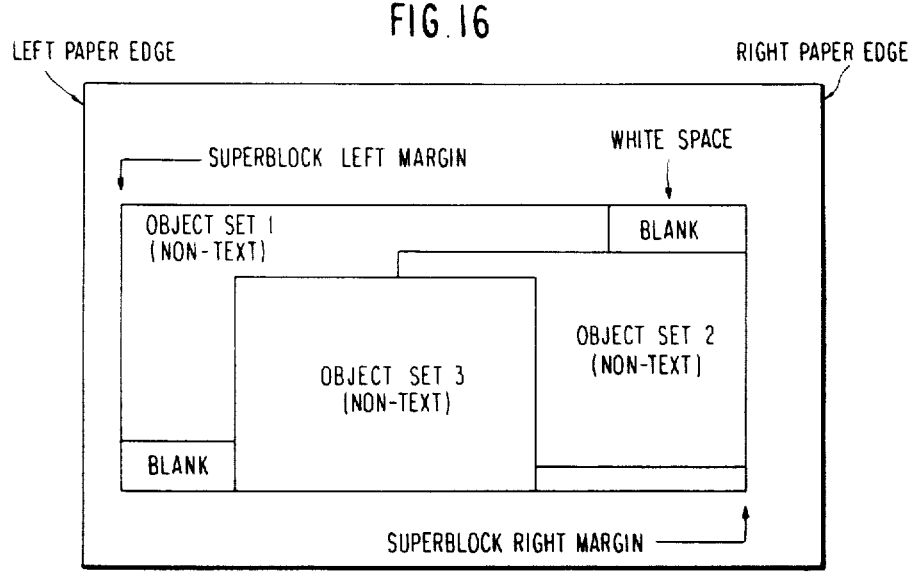
FIG. 16 shows an object set overlay with non-text object sets creating a super block according to the subject invention.
Figure 17:
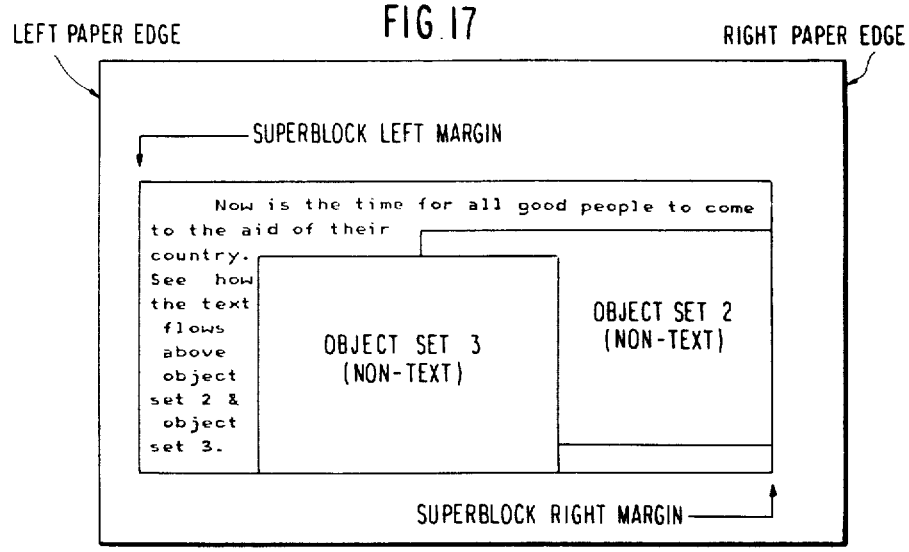
FIG. 17 shows an object overlay creating a superblock with a text object.

To further illustrate the superblock structure, FIG. 16 shows an example of a superblock where non-text object sets overlay each other, and FIG. 17 shows an example where there is a text object set with non-text object sets illustrating again that whereas no-text object sets may overlay one another, they may not overlay a text object set. The superblock is implicitly created by the editor as the result of a user having specified the CREATE, MOVE, COPY, PASTE or GET action and as a result of that action, at least two object sets are occupying the same display space. The actions which are applicable to the super block are generic functions, e.g. if the user selects MOVE, COPY, GET or DELETE of the superblock, the selected action is applied against all the object sets within tne superblock as if they were one entity. If the destination for the MOVE, COPY or GET of tne superblock is another superblock or an object set, the original superblock structure is replaced by a new super block structure at the destination location. In other words, the superblock structure, once it is created, is treated by the editor as another object set thereby greatly simplifying the computations performed by the editor. If the user selects an object set within the super block, the command bar changes to reflect the actions which are valid for that type of object set. The location of the object set does not affect the result the action has on the object set. Inside the superblock, the object set can be moved, copied, deleted, described, etc.

On creation of the superblock, the editor determines what the left and right margin offsets should be. The user can change these margin offsets by selecting the superblock icon and then selecting DESCRIBE from the command bar. This causes the pop-down panel shown in FIG. 18 of the drawings to be displayed. As can be seen in that figure, the user can also specify a name, change the space before and after the superblock, and set the protection attribute via this pop-down panel. The following are the rules the editor uses for object set placement when creating a super block structure:

(1) The destination selected for placement of the object set is the starting point for the top left margin boundary of the object set. The right margin offset remains the same.

(2) If the left margin defined is greater than or equal to the right margin offset, the editor will not place the object set within the super block.

(3) If all the contents of the object set cannot be displayed, the object set is clipped by the editor to fit the space. The data then becomes scrollable within the new boundaries.

(4) Text object sets cannot be overlayed.

(5) If there is enough space to the left or right of a non-text object set, text whose flow attribute is on will flow naturally to fill in the white space. If there is not enough space, the text object set will be placed after the non-text object set.

A super block can cross page end boundaries as long as the data within the super block can be split across pages. The super block structure simplifies the bookkeeping required by the paginator. As long as the super block does not cross the end of a page, the paginator only needs to know the total height of the super block structure. If the super block needs to be split across two pages, the paginator must examine each of the object sets within the super block to see if the data is such that the super block can be split. If the superblock can be split, the paginator must determine at what point the split can occur.

With the creation of the superblock structure, the editor limits the handling of complex data within the structure to only those times when a page end decision must be made. Also, presentation on the display is less messy because there is one icon to represent the superblock instead of an icon next to each object set within the superblock structure. Thus, although the superblock is a complex structure, the creation of this structure by the editor greatly simplifies integration and manipulation of different data types on the page. The superblock allows the user to manipulate a group of object sets within a single displayable area on the page with relative ease.

Figure 19:
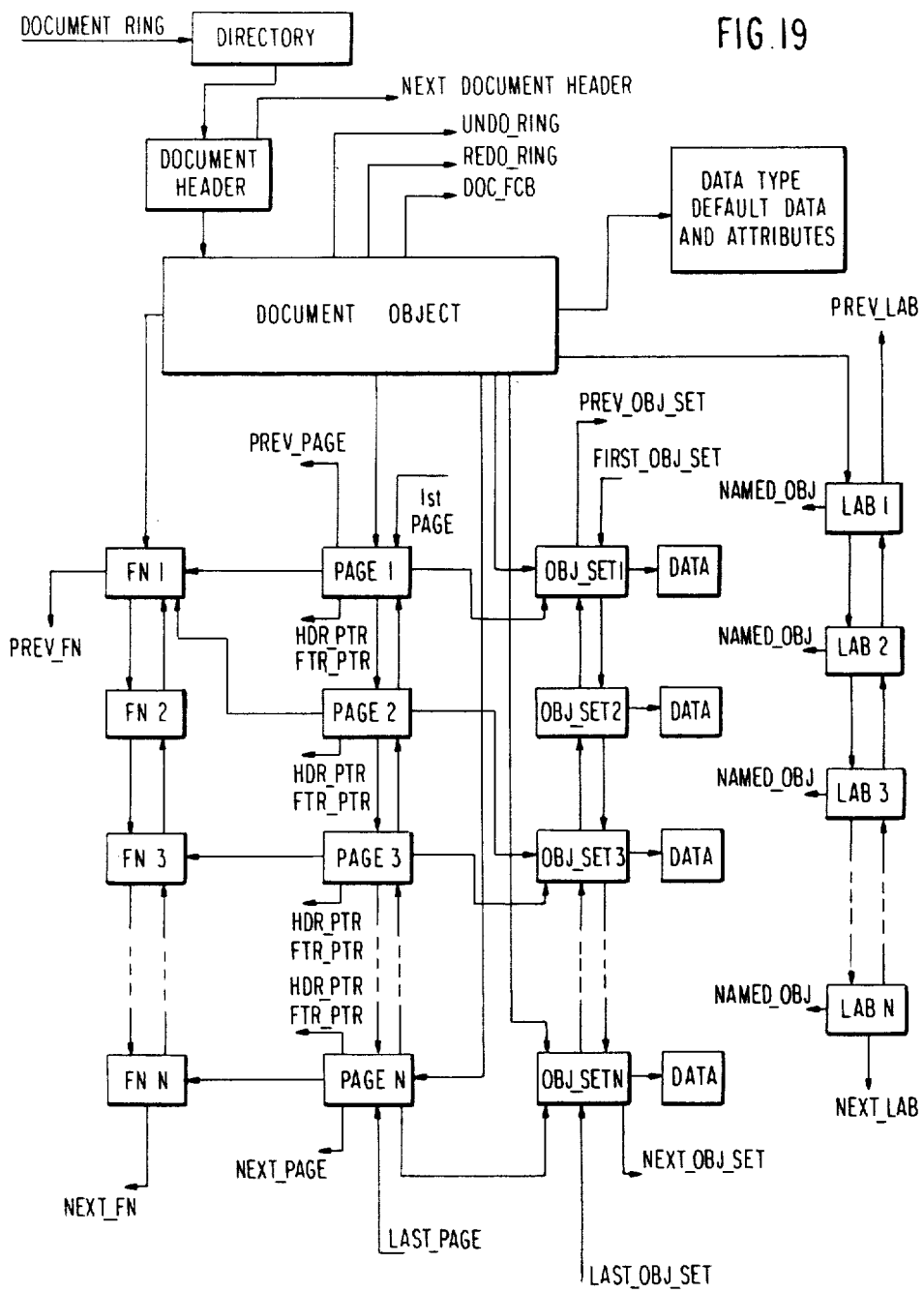
FIG. 19 is a block diagram of the document object data structure linked into the document ring of the application composite editor upon which the improvement according to a preferred embodiment of the invention is based.

FIG. 19 shows the document object data structure linked into the document ring of the application composite editor. The document is accessed in the document ring by the directory which points to the document header which, in turn, points to the document object and the next document header. The document object points to the undo ring, the redo ring and the formatting information, doc_fcb, as in the POLITE editor. An object set is the basis of the application composite editor architecture, and the document object points to the first label and that, in turn, points to the first object set, obj_setl. Each object set points to the previous and next object set; each object can have a name; each object set can be part of a user-defined block that is to be kept together on one page; and each object set has a unique identification used in paging data. As may be appreciated from the architecture shown in FIG. 19, all data in the editor resides on pages and all pages reside within the composite document.

Figures 18, 20:
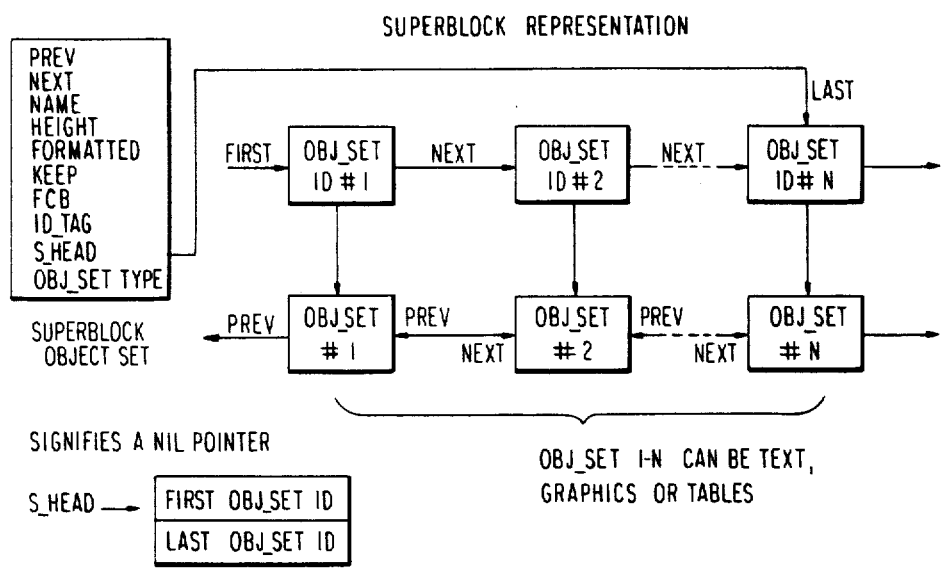
FIG. 18 illustrates a superblock object DESCRIBE pop-down panel according to the invention.
FIG. 20 is a block diagram of the superblock as implemented internally by the application composite editor.

One or more of the object sets in the data structure shown in FIG. 19 may be a superblock structure. A representation of the super block structure is shown in FIG. 20. The Pascal implementation of the superblock structure is stated below:

---

PASCAL CODE FOR SUPERBLOCK DEFINITION

```
distance = integer; {some number of generic units}
         {id for requesting editor objects from storage mgmt}
obj_id = word;
         {pointer to object set formatting information}
fcb_ptr =    obj_set_fcb;
         {pointer to user defined label information}
label_ptr =  n_label;
         {pointer to table specific object set information}
tbl_head_ptr =   tbl_head;
         {pointer to graphics specific part of obj_set}
g_head_ptr =  g_head;
         {pointer to text specific information in obj_set}
txt_head_ptr =   txt_head;
         {pointer to super block specific object set info}
sblk_head_ptr =  sblk_head;
sblk_head =              {super block information}
     record
         first_obj_set,  {first object set in super block}
         last_obj_set : obj_set_id_ptr;  {last object set}
     end;
o_types = (            {types of object sets}
         {obj_set consisting of two or more obj_set types}
      superblock,
      text_obj, {a single line, a paragraph or list obj_set}
      graph_obj,        {draw or business graphics object_set}
      table_obj);       {spreadsheet or one_cell table obj_set}
obj_set_ptr =  object_set;  {pointer to an object set}
object_set =
     record
         prev,
         next        : obj_set_ptr;
         name        : label_ptr;
         height      : distance;  {how high is the object set }
         formatted,              {is the obj_set ready for display}
```

-continued

| PASCAL CODE FOR SUPERBLOCK DEFINITION | |
|---|---|
| keep | : boolean; {can the obj_set be split} |
| fcb | : fcb_ptr; {pointer to format info} |
| id_tag | : obj_id; {unique id for object set} |
| case obj_set_type : o_types of | |
|   superblock | : (s_head : sblk_head_ptr); |
|   graph_obj | : (g_head : g_head_ptr); |
|   table_obj | : (t_head : tbl_head_ptr); |
|   text_obj | : (text_head : txt_head_ptr); |
| end; | |
| {An obj_set_id_ptr is a pointer to the structure containing the information on each object set within a super block.} | |
| obj_set_id_ptr = obj_set_id; | |
| obj_set_id = | |
|   record | |
|   loc | : offset; {location within the super block } |
|   next_obj_set | : obj_set_id_ptr; {next sblk obj_set} {assumes left to right order} |
|   {ptr to obj_set associated with this id ptr} | |
|   obj_set : obj_set_ptr; | |
| end; | |

The following is an explanation of the fields of a super block object set:

| | |
|---|---|
| prev = | pointer to the previous object set. |
| next = | pointer to the next object set. |
| name = | pointer to any user defined label info. |
| height = | height in generic units of the superblock. |
| formatted = | flag indicating if the superblock has been formatted. |
| keep = | flag indicating if the superblock can be split across two pages. |
| fcb = | pointer to the formatting information for the superblock. |
| id_tag = | unique identification number assigned to this superblock. |
| s_head = | pointer to the superblock specific info: the first object set id structure and the last object set id structure. |
| obj_set_type = | scaler indicating that the object set is a superblock. |

All of the above fields except the s_head are common to all object sets. For a text object set, the variant pointer field is a txt_head, for a graphics object set, the variant pointer field is a g_head, and for a table object set, the variant pointer field is a tbl_head. The following is an explanation of the fields of an object set identification structure:

| | |
|---|---|
| loc = | the x,y offset of the object set associated with this object set id. |
| next_obj_set = | pointer to the next object set id structure in this super block. |
| obj_set = | pointer to the object set associated with this object set id. |

The height field of an object set is used by the paginator when formatting a page in a document. In the case of a superblock object set, as long as the height plus the current space used on the page is less than or equal to the total space available on the page, the contents of the first through the last object set within the super block do not have to be examined by the paginator. This greatly simplifies what could be a complex process if the super block structure did not exist. The formatted and keep flags are boolean fields used by the paginator to determine if further processing must be done on the super block in order for pagination to continue. If keep=true, the super block cannot be split across two pages.

Thus, according to a preferred embodiment of the invention, a super block is implemented as an object set type within the application composite editor, there now being four object set types, namely text, graphic, table and superblock. When the superblock is created, an object set is defined and the editor allocates an internal structure or object set to represent the object within the document buffer. All object set structures are similar except for the bottom half which varies according to the type of object set. These structures are implemented in the programming language Pascal. Data types that vary are implemented with Pascal variant records. The variant part of the superblock is represented by a pointer (s_head) to the super block specific structure information. The specific structure information (sblk_head) consists of two pointers: a first object set pointer (first_obj_set) and a last object set pointer (last_obj_set). Each of these pointers is an object set identification (id) pointer type (obj_set_id$_{13}$ ptr) which means a pointer to an object set id record structure (obj_set_id). An object id is a Pascal structure consisting of three fields: loc, which contains the x,y offset within the superblock; next_obj_set, which is a pointer to the next object set id in the super block; and obj_set, which is a pointer to the object set associated with the object set id. The object sets which can be in one superblock are text, tables or graphics. The implementation does not preclude superblocks within superblocks.

We claim:

1. In an integrated multiple data editor of the type which produces a compound document having diverse text and/or non-text objects positioned on the same page or on the preceding or succeeding page of the document, said editor manipulating object sets containing said objects wherein each object set has a data structure for its type including data which points to the previous and next object sets and each object set data structure has a unique identification used in paging data, said object sets each having objects of the same type residing therein and being delineated by displayable icons indicating the object set type, the method of implicitly creating a superblock data structure containing data which points to two or more object set data structures for object sets positioned so that the object sets overlap one another, reside side-by-side or extend above or below one another so that the document may be formatted by manipulating the superblock data structure as a single entity as if it were an object set data structure without taking into consideration the complexity inside the superblock data structure except when a page end decision must be made, the process of implicitly creating said superblock data structure comprising the steps of:

selecting a location within a first object set where a second object set is to be added, and adding said second object set at the selected location and creating said superblock data structure as an object set data structure while retaining the data structures of said first and second object sets within said superblock data structure.

2. The method as recited in claim 1 wherein the process of implicitly creating said superblock data structure further comprises the steps of:

removing the displayable icons which delineate each of the object sets of the object set data structure within the superblock data structure, and delineating the superblock data structure by a single displayable icon without regard to the complexity inside the superblock data structure.

3. The method as recited in claim 1 wherein the step of selecting is performed by the step of pointing to said location.

4. The method as recited in claim 1 wherein the step of adding comprises the steps of:
creating as said second object set a new object set of type text, image, graphics or data;
inserting said new object set at said selected location; and
linking said new object set of type text, image, graphics or data to said selected location.

5. The method as recited in claim 1 wherein the step of adding comprises the steps of:
moving said second object set of type text, image, graphics or data from another location within said document to said selected location; and
linking said second object set of type text, image, graphics or data from another location to said selected location.

6. The method as recited in claim 1 wherein the step of adding comprises the steps of:
copying said second object set of type text, image, graphics or data from another location within said document to said selected location; and
linking said second object set of type text, image, graphics or data from another location to said selected location.

7. The method as recited in claim 1 wherein the step of adding comprises the steps of:
pasting said second object set of type text, image, graphics or data from a paste buffer to said selected location; and
linking said second object set of type text, image, graphics or data from another location to said selected location.

8. The method as recited in claim 1 wherein the step of adding comprises the steps of:
getting a second object set of type text, image, graphics or data from another location within said document or a location in another document;
putting said second object set at said selected location; and
linking said second object set of type text, image, graphics or data from another location to said selected location.

9. The method as recited in claim 1 wherein the purpose of implicitly creating said superblock data structure further comprises the steps of:
creating an object set data structure of the type superblock and linking the superblock data structure at a point of linkage of the first object set data structure,
linking said object set data structure of type superblock to the first object set data structure, storing a location offset of the first object set relative to a top left corner of a displayable area of the superblock data structure, and resetting the first object set data structure linkage to a correct linkage as an object set data structure in said object set data structure of type superblock,
linking the second object set data structure to said object set data structure of type superblock and storing a selected location of the second object set relative to the top left corner of the displayable area of the superblock in said object set data structure of type superblock,
calculating the height of the displayable area of the superblock by determining the size of the rectangular area encompassing the first object set and the added second object set, and
storing the height in a hight field of said object set data structure of type superblock.

* * * * *

UNITED STATES PATENT AND TRADEMARK OFFICE
CERTIFICATE OF CORRECTION

PATENT NO. : 4,739,477

DATED : April 19, 1988

INVENTOR(S) : B. A. Barker et al

It is certified that error appears in the above-identified patent and that said Letters Patent is hereby corrected as shown below:

Col. 24, lines 9-10, delete "purpose" and insert --process--.

Signed and Sealed this

Twentieth Day of August, 1991

Attest:

HARRY F. MANBECK, JR.

*Attesting Officer*  Commissioner of Patents and Trademarks